United States Patent
Harada et al.

(10) Patent No.: US 11,855,749 B2
(45) Date of Patent: Dec. 26, 2023

(54) SATELLITE COMMUNICATION SYSTEM, MASTER STATION DEVICE AND LINE CONNECTION METHOD

(71) Applicant: NIPPON TELEGRAPH AND TELEPHONE CORPORATION, Tokyo (JP)

(72) Inventors: Koichi Harada, Musashino (JP); Hiroki Shibayama, Musashino (JP); Masaki Shima, Musashino (JP); Fumihiro Yamashita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/781,372

(22) PCT Filed: Dec. 13, 2019

(86) PCT No.: PCT/JP2019/048995
§ 371 (c)(1),
(2) Date: May 31, 2022

(87) PCT Pub. No.: WO2021/117235
PCT Pub. Date: Jun. 17, 2021

(65) Prior Publication Data
US 2023/0006735 A1 Jan. 5, 2023

(51) Int. Cl.
*H04B 7/185* (2006.01)
*H04W 76/18* (2018.01)
*H04W 56/00* (2009.01)

(52) U.S. Cl.
CPC ..... *H04B 7/18584* (2013.01); *H04B 7/18589* (2013.01); *H04W 56/0015* (2013.01); *H04W 76/18* (2018.02)

(58) Field of Classification Search
CPC ........... H04B 7/18584; H04B 7/18589; H04W 56/0015; H04W 76/18; H04W 84/20; H04W 56/00
See application file for complete search history.

(56) References Cited

U.S. PATENT DOCUMENTS

2008/0177822 A1* 7/2008 Yoneda ............ H04N 21/43615
709/202
2018/0348376 A1* 12/2018 Derbez ................... G01S 19/23
(Continued)

FOREIGN PATENT DOCUMENTS

EP 2420902 A2 * 2/2012 ............... G04G 7/02
JP H0697862 A 4/1994
(Continued)

OTHER PUBLICATIONS

Akira Matsushita et al., Infrastructure satellite communication system applied to disaster countermeasure services, NTT Technical Journal, vol. 17, No. 9, 2005, pp. 14-17.

*Primary Examiner* — Afshawn M Towfighi
(74) *Attorney, Agent, or Firm* — Harness, Dickey & Pierce, P.L.C.

(57) ABSTRACT

A satellite communication system communicates via a communication satellite using one of a plurality of portable station devices as a master station device and another portable station device as a slave station device. The master station device transmits a first control signal for the slave station device to establish synchronization. The master station device determines that the slave station device is in a communicable state by a second control signal received from the slave station device that has received the first control signal and established synchronization. The master station device selects one of at least one slave station devices in a communicable state and transmits a third control signal for instructing start of transmission of a communication (Continued)

signal to the selected slave station device and the subject device. Due to this, it is possible to connect a channel between portable station devices without the intervention of a control station device or a regulation station device.

5 Claims, 7 Drawing Sheets

(56) References Cited

U.S. PATENT DOCUMENTS

| | | | |
|---|---|---|---|
| 2020/0281027 A1* | 9/2020 | Damnjanovic | ... H04W 74/0891 |
| 2020/0374702 A1* | 11/2020 | Damnjanovic | ... H04W 72/0453 |
| 2021/0243713 A1* | 8/2021 | Ellenbeck | ........... H04W 56/002 |

FOREIGN PATENT DOCUMENTS

| | | |
|---|---|---|
| JP | H098723 A | 1/1997 |
| JP | H11331056 A | 11/1999 |

\* cited by examiner

SATELLITE COMMUNICATION SYSTEM, MASTER STATION DEVICE AND LINE CONNECTION METHOD

CROSS-REFERENCE TO RELATED APPLICATIONS

This application is a 371 U.S. National Phase of International Application No. PCT/JP2019/048995, filed on Dec. 13, 2019. The entire disclosure of the above application is incorporated herein by reference.

TECHNICAL FIELD

The present invention relates to a technique for connecting a channel between portable station devices in a satellite communication system without being controlled by a regulation station device and a control station device.

BACKGROUND ART

In a general satellite communication system, a channel is connected between a base station device and a plurality of portable station devices via a communication satellite. In such a satellite communication system, the regulation station device manages and controls information related to operations such as information on the portable station device and schedule reservation information. For example, the regulation station device sends a control command for controlling the portable station device to the control station device, and the control station device sends a control command to the portable station device via a control channel of a communication satellite. Since the portable station device is operated by the schedule reservation information installed in the regulation station device, in order to change the operation of the portable station device, it is necessary for an operator to make an operation reservation for the portable station using an HMI (Human Machine Interface) connected to the regulation station device (see, for example, NPL 1).

CITATION LIST

Non Patent Literature

[NPL 1] Akira Matsushita et al., "Infrastructure satellite communication system applied to disaster countermeasure services", NTT Technology Journal 2005.9

SUMMARY OF THE INVENTION

Technical Problem

In the prior art, in order to connect a channel between portable station devices via a communication satellite, it is necessary to manage the schedule of the regulation station device. For example, using one of a plurality of portable station devices as a master station device and the other portable station devices as slave station devices, when a channel is connected between the master station device and a slave station device, or the connection is changed from the slave station device in which the channel is connected to another slave station device, the operator needs to change the schedule management of the regulation station device, or if there is no schedule management, it is necessary to control the portable station device by another communication means.

An object of the present invention is to provide a satellite communication system, a master station device, and a channel connection method capable of connecting and switching a channel between portable station devices without the intervention of a control station device or a regulation station device.

Means for Solving the Problem

The present invention provides a satellite communication system that communicates via a communication satellite using one of a plurality of portable station devices as a master station device and another portable station device as a slave station device, the master station device is configured to: transmit a first control signal for the slave station device to establish synchronization; determine that the slave station device is in a communicable state by a second control signal received from the slave station device that has received the first control signal and established synchronization; and select one of at least one slave station devices in a communicable state and transmit a third control signal for instructing start of transmission of a communication signal to the selected slave station device and the subject device.

The present invention provides a master station device that is one of a plurality of portable station devices and communicates via a communication satellite using another portable station device as a slave station device, including: a control unit configured to: transmit a first control signal for the slave station device to establish synchronization; determine that the slave station device is in a communicable state by a second control signal received from the slave station device that has received the first control signal and established synchronization; and select one of at least one slave station devices in a communicable state and transmit a third control signal for instructing start of transmission of a communication signal to the selected slave station device and the subject device.

The present invention provides a channel connection method for a master station device and a slave station device to perform communication in a satellite communication system that communicates via a communication satellite using one of a plurality of portable station devices as the master station device and another portable station device as the slave station device, wherein the master station device executes the processes of: transmitting a first control signal for the slave station device to establish synchronization; determining that the slave station device is in a communicable state by a second control signal received from the slave station device that has received the first control signal and established synchronization; and selecting one of at least one slave station devices in a communicable state and transmitting a third control signal for instructing start of transmission of a communication signal to the selected slave station device and the subject device.

Effects of the Invention

The satellite communication system, the master station device, and the channel connection method according to the present invention can connect and switch a channel between portable station devices without the intervention of a control station device or a regulation station device.

DESCRIPTION OF EMBODIMENTS

Hereinafter, embodiments of a satellite communication system, a master station device, and a channel connection method according to the present invention will be described with reference to the drawings.

Figure 1:
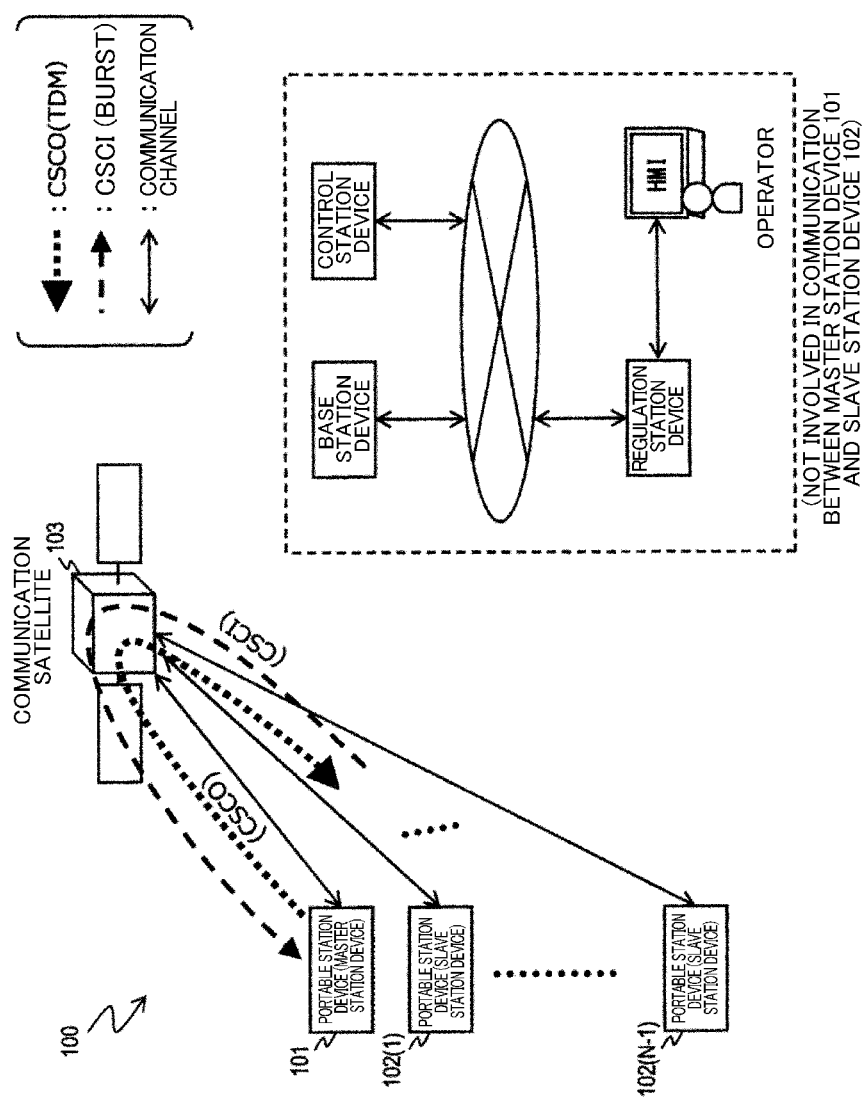
FIG. 1 is a diagram illustrating a configuration example of a satellite communication system according to the present embodiment.

FIG. 1 illustrates a configuration example of a satellite communication system 100 according to the present embodiment. In FIG. 1, in the satellite communication system 100, one of N (N is a positive integer) portable station devices is used as a master station device 101, and the other portable station devices are used as slave station devices 102 (slave station device 102(1) to slave station device 102(N−1)). The master station device 101 connects a channel to any one of the slave station devices 102 via a communication satellite 103. The communication satellite 103 has the master station device 101 and the plurality of slave station devices 102 in its communication area. For example, a signal transmitted from the communication satellite 103 can be received by the master station device 101 and the plurality of slave station devices 102. Here, in the following description, when common description is given for the slave station device 102(1) to the slave station device 102(N−1), the (number) at the end of the reference sign is omitted and they will be described as the slave station device 102. When indicating a specific slave station device 102, it is described as, for example, the slave station device 102(1). The same applies to portable station devices 901 of a comparative example described later.

In FIG. 1, the master station device 101 transmits a control signal (CSCO (Common Signaling Channel Outband) signal) to the slave station device 102 (transmission of first control signal). The CSCO signal is transmitted by a time division multiplexing (TDM) method. The slave station device 102 receives the CSCO signal from the master station device 101, establishes synchronization, and transmits a control signal (CSCI (Common Signaling Channel Inband) signal) indicating that synchronization has been established to the master station device 101 (transmission of second control signal). The CSCI signal is transmitted by a burst method.

Upon receiving the CSCI signal from the slave station device 102, the master station device 101 determines that the slave station device 102 is in a communicable state, and notifies the operator of the master station device 101 on a display panel 210 or the like described later. Here, the master station device 101 constantly transmits a CSCO signal for the slave station device 102 to establish synchronization, and receives CSCI signals from a plurality of slave station devices 102 that have established synchronization. When the CSCI signal, which is a burst signal, is received from the plurality of slave station devices 102 at the same time, the master station device 101 may not be able to recognize the CSCI signal, but since the master station device 101 constantly transmits the CSCO signal, the master station device 101 can normally recognize the CSCI signal transmitted again from the slave station device 102.

In this way, the master station device 101 can grasp the communicable slave station device 102 and notify the master station operator on the display panel 210 or the like. Then, when the master station operator selects a desired slave station device 102 to communicate with from the communicable slave station devices 102 and instructs the start of transmission, the master station device 101 can transmit a CSCO signal instructing to start transmission to the desired slave station device 102 (transmission of third control signal) and communicate with the desired slave station device 102. The third control signal is transmitted not only to the desired slave station device 102 but also to the master station device 101 itself (subject device) by loopback at the communication satellite 103. Here, both the master station device 101 and the slave station device 102 are similar portable station devices, and when they receive a CSCO signal instructing to start transmission, they operate to start transmitting the communication signal on the communication channel. Therefore, the master station device 101 can perform an operation of starting the transmission of the communication signal on the communication channel in the same manner as the slave station device 102 by receiving the CSCO signal transmitted by itself by the satellite's loopback. Due to this, it is not necessary to install the processing and functions dedicated to the master station device 101, the configurations and functions of the master station device 101 and the slave station device 102 can be shared, and any one of the plurality of portable station devices can be operated as the master station device 101.

As described above, in the satellite communication system 100 according to the present embodiment, the base station device, the control station device, the regulation station device, and the like do not participate in the communication between the master station device 101 and the slave station device 102, and the master station device 101 and the slave station device 102 can independently connect a channel and perform communication.

In FIG. 1, the control signal and the communication signal transmitted and received by the master station device 101 and the slave station device 102 use channels having different frequency bands, and each channel is frequency-division-multiplexed (FDM).

Figure 2:
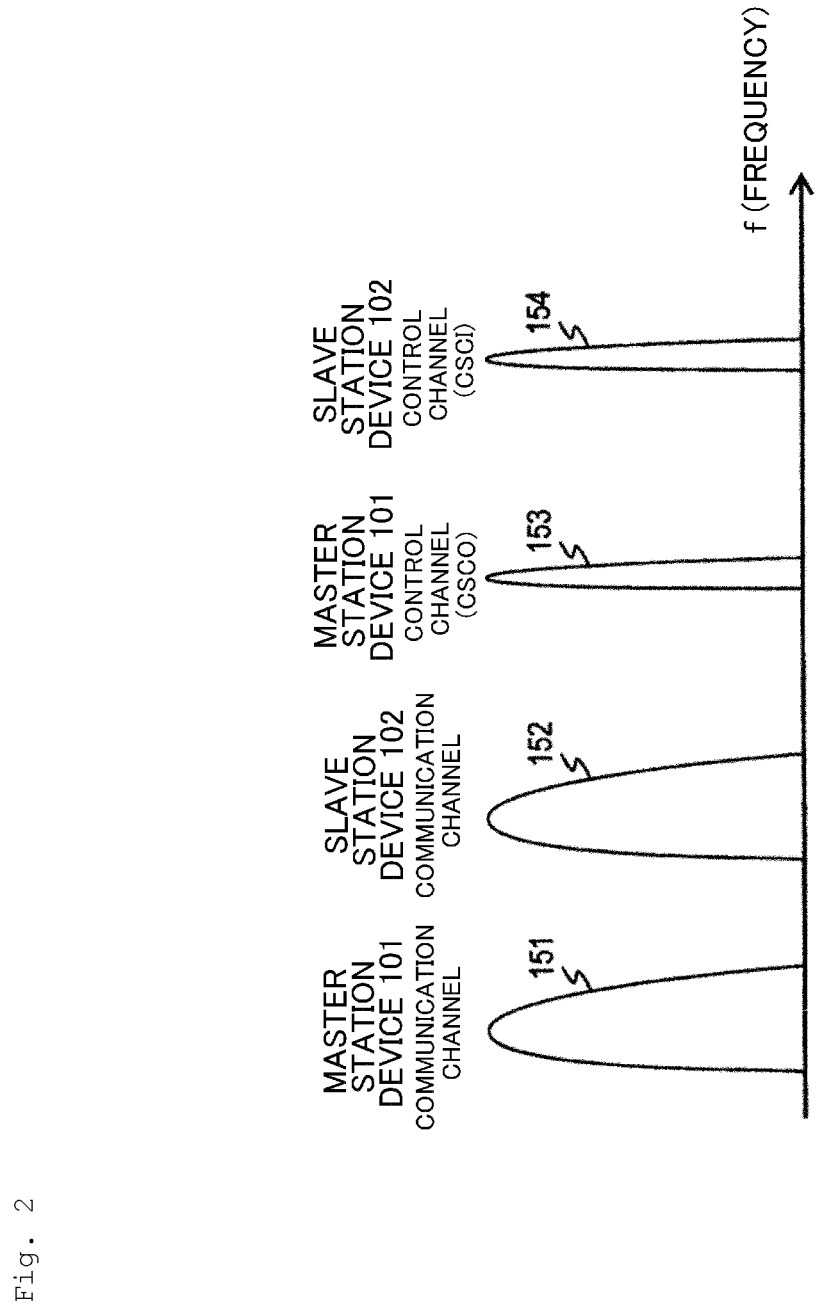
FIG. 2 is a diagram illustrating a state in which control signals and communication signals transmitted and received by a master station device and a slave station device are frequency-division-multiplexed.

FIG. 2 illustrates a state in which the control signals and communication signals transmitted and received by the master station device 101 and the slave station device 102 are frequency-division-multiplexed. In FIG. 2, the horizontal axis represents the frequency f. As illustrated in FIG. 2, a communication channel 151 for transmitting a communication signal from the master station device 101 to the slave station device 102, a communication channel 152 for transmitting a communication signal from the slave station device 102 to the master station device 101, a control channel 153 for transmitting the CSCO signal from the master station device 101 to the slave station device 102, a control channel 154 for transmitting the CSCI signal from the slave station device 102 to the master station device 101 are frequency-division-multiplexed. Due to this, when a communication signal is transmitted and received to and from the slave station device 102(1) (during communication), the master station device 101 can transmit a CSCO signal to another slave station device 102 and receive a CSCI signal from another slave station device 102. Since the CSCO signal transmitted by the master station device 101 is relayed by the communication satellite 103 and transmitted into the communication area again, the CSCO signal transmitted by the master station device 101 is received by not only the slave station device 102 but also the master station device 101 itself.

Here, a satellite communication system 900 of a comparative example will be described so that the features of the satellite communication system 100 according to the present embodiment can be easily understood.

Figure 3:
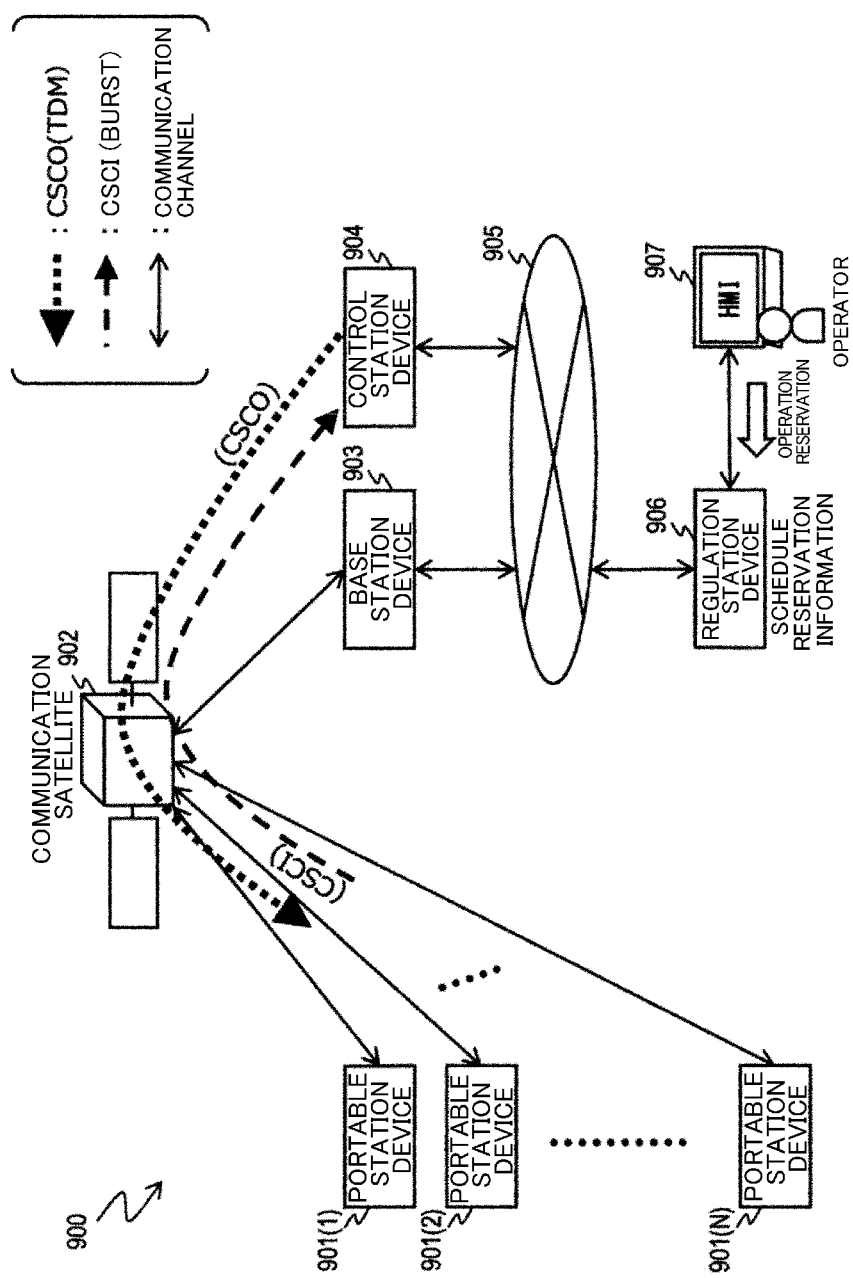
FIG. 3 is a diagram illustrating a configuration example of a satellite communication system of a comparative example.

FIG. 3 illustrates a configuration example of the satellite communication system 900 of the comparative example. In FIG. 3, the satellite communication system 900 of the comparative example forms a communication channel between a base station device 903 and N portable station devices 901 (portable station device 901(1) to portable station device 901(N)) via a communication satellite 902 and transmits and receives a communication signal. The portable station device 901 forms a control channel with the control station device 904 via the communication satellite 902, and transmits and receives a control signal. The base station device 903 and the control station device 904 are connected to a regulation station device 906 via a network 905, and an operator manages and controls the operation of the satellite communication system 900 using an HMI 907. For example, when the operator makes an operation reservation for the schedule for the portable station device 901 to communicate with the regulation station device 906, the schedule reservation information is held in the regulation station device 906, and the regulation station device 906 instructs the control station device 904 to control the portable station device 901 on the basis of the schedule reservation information. The control station device 904 transmits a CSCO signal to the portable station device 901 by the TDM method to establish synchronization and control transmission, and conversely, receives a CSCI signal from the portable station device 901 by the burst method to acquire information on the portable station device 901.

As described above, in the satellite communication system 900 of the comparative example, the regulation station device 906, the control station device 904, and the like manages and controls the operation of the portable station device 901. Therefore, it is difficult for the portable station devices 901 to communicate with each other independently without the intervention of the regulation station device 906 and the control station device 904. In contrast, in the satellite communication system 100 according to the present embodiment described with reference to FIG. 1, one of the portable station devices is used as the master station device 101 and the other portable station device are used as the slave station devices 102, and the master station device 101 controls the other slave station devices 102. Therefore, the master station device 101 and the slave station device 102 can independently communicate with each other without the intervention of the control station device 904 or the regulation station device 906 unlike the comparative example.

Figure 4:
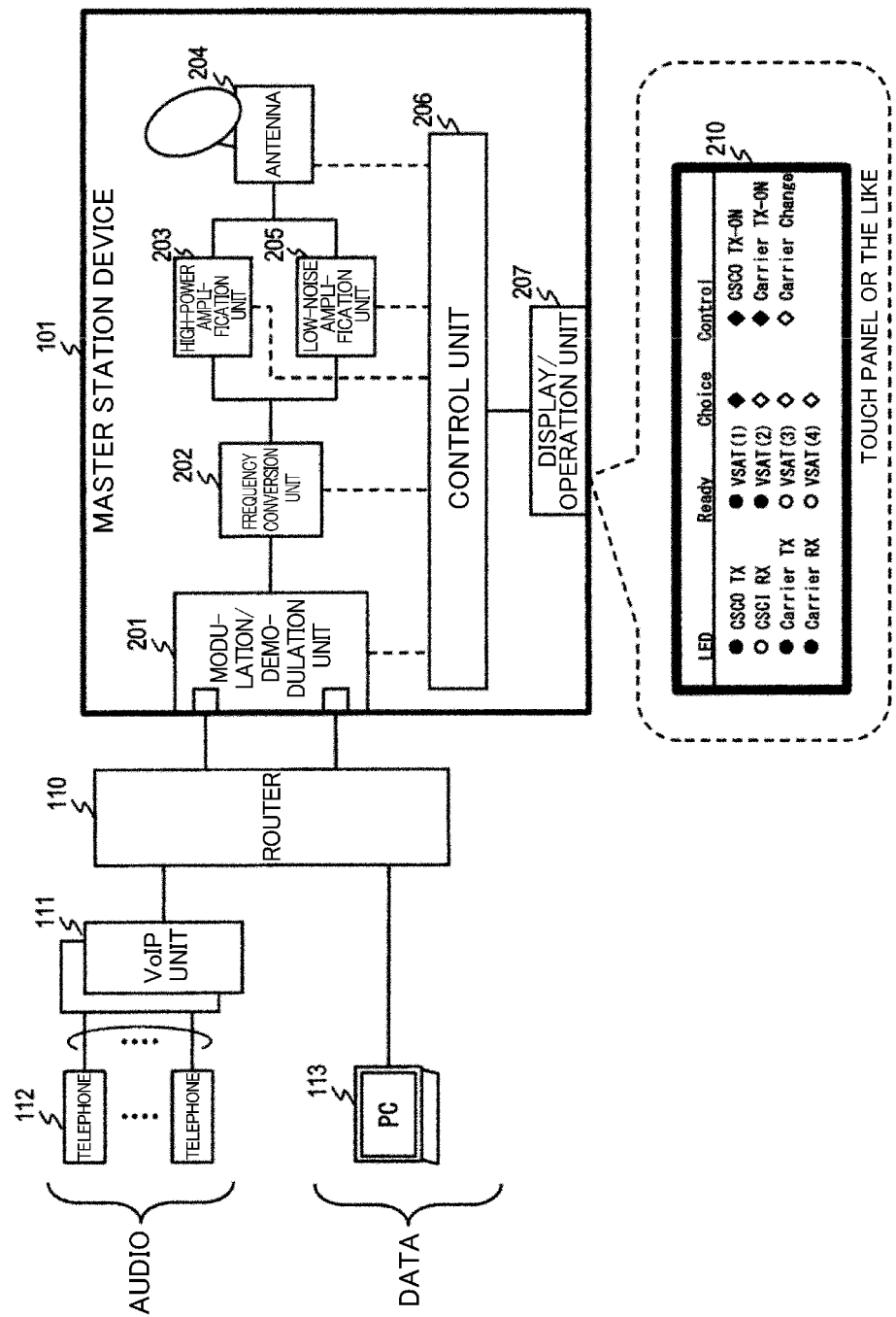
FIG. 4 is a diagram illustrating a configuration example of a master station device.

FIG. 4 illustrates a configuration example of the master station device 101 according to the present embodiment. In FIG. 4, the master station device 101 includes a modulation/demodulation unit 201, a frequency conversion unit 202, a high-power amplification unit 203, an antenna 204, a low-noise amplification unit 205, a control unit 206, and a display/operation unit 207.

The modulation/demodulation unit 201 modulates a signal of an audio system such as a telephone 112 connected via a router 110 and a VoIP unit 111 and a signal of a data system such as a PC (Personal Computer) 113 connected via the router 110 to obtain a communication signal and outputs the communication signal to the frequency conversion unit 202. Similarly, the modulation/demodulation unit 201 demodulates the communication signal input from the frequency conversion unit 202, and outputs the audio signal to the telephone 112 and the data signal to the PC 113 via the router 110.

The frequency conversion unit 202 converts a baseband signal input and output to and from the modulation/demodulation unit 201 into a high-frequency signal for transmission/reception to/from the communication satellite 103.

The high-power amplification unit 203 amplifies transmission signals such as control signals and communication signals output by the frequency conversion unit 202 into high-power signals and outputs them to the antenna 204.

The antenna 204 transmits a high-power transmission signal output from the high-power amplification unit 203 to the communication satellite 103. The antenna 204 outputs a reception signal received from the communication satellite 103 to the low-noise amplification unit 205.

The low-noise amplification unit 205 amplifies the reception signal of the communication satellite 103 output from the antenna 204 into a low-noise signal and outputs it to the frequency conversion unit 202.

The control unit 206 is configured of a CPU (Central Processing Unit) or the like that operates according to a program stored in advance, and executes a process of controlling each block of the master station device 101. For example, the control unit 206 executes processing such as the control of the modulation/demodulation method of the modulation/demodulation unit 201, the frequency control of the frequency conversion unit 202, the gain control of the high-power amplification unit 203 and the low-noise amplification unit 205, the direction control of the antenna 204, and the display on the display/operation unit 207, and the operation input of the master station operator to the display/operation unit 207. The control unit 206 executes processing of generating a CSCO signal on the basis of the operation of the display/operation unit 207 and transmitting the signal to the communication satellite 103 via the modulation/demodulation unit 201, the frequency conversion unit 202, the high-power amplification unit 203, and the antenna 204. Similarly, the control unit 206 executes processing of outputting the state of the slave station device 102 to the display/operation unit 207 on the basis of the CSCI signal received via the antenna 204, the low-noise amplification unit 205, the frequency conversion unit 202, and the modulation/demodulation unit 201.

The display/operation unit 207 is configured of an operation interface such as a display for displaying the communication state of the master station device 101 and notifying the master station operator, and a touch panel to be operated by the master station operator and is controlled by the control unit 206. For example, the display/operation unit 207 has the display panel 210 as illustrated in FIG. 4, and performs operations of the master station operator, notification to the master station operator, and the like. The details of the display panel 210 will be described later.

As described above, the master station device 101 according to the present embodiment can check whether the slave station device 102 is in a communicable state, select a communicable slave station device 102, and connect a channel with the slave station device 102. The master station device 101 can select another communicable slave station device 102 during communication with the slave station device 102 and switch the channel to the slave station device 102. Due to this, the satellite communication system 100 according to the present embodiment can connect a channel between the master station device 101 and the slave station device 102 (between the portable station devices) without the intervention of the control station device or the regulation station device.

Figure 5:
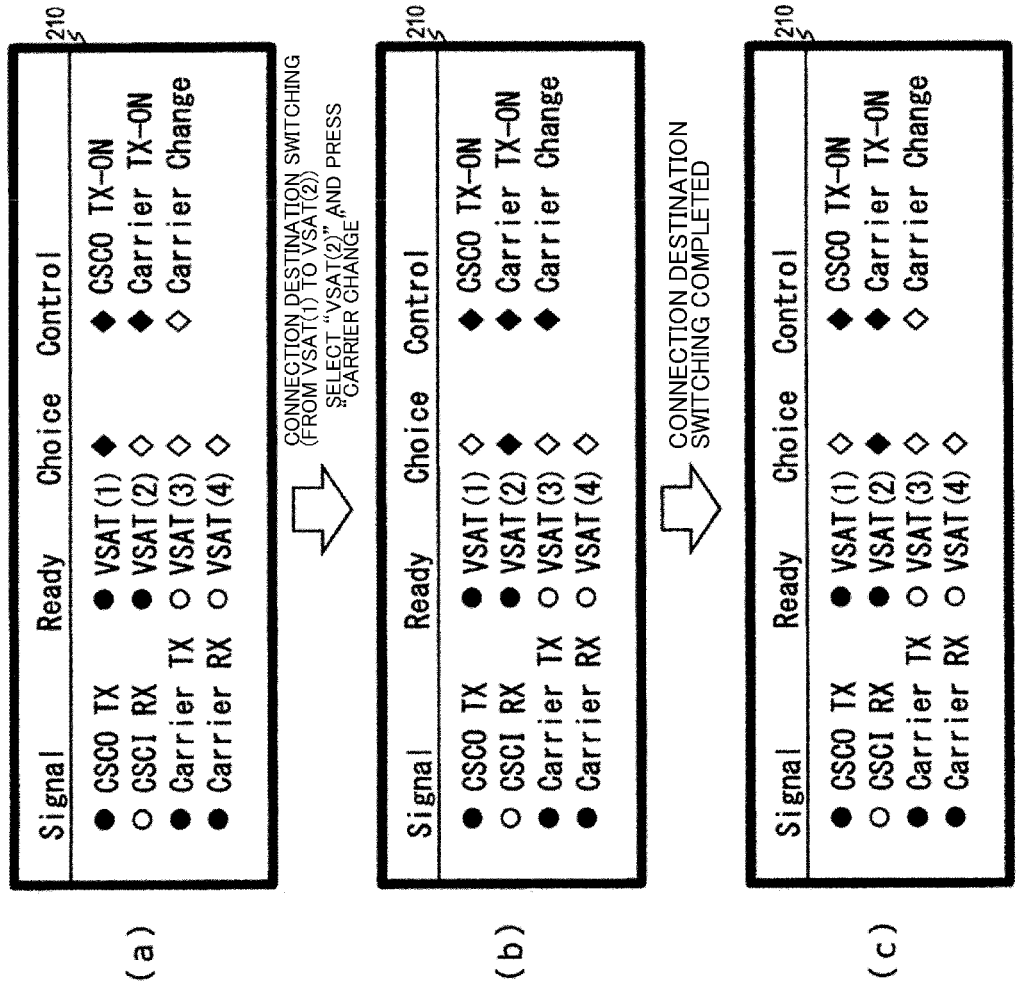
FIG. 5 is a diagram illustrating an example of a display panel of a master station device.

FIG. 5 illustrates an example of the display panel 210 of the master station device 101. (a), (b) and (c) of FIG. 5 illustrate examples in which the state of the display panel 210 such as the selection state of the slave station device 102, the communication state of the control signal and the communication signal, and the control state changes according to the operation. The display panel 210 has a touch panel and also functions as an operation interface operated by the master station operator. In the display panel 210, the circles and diamonds are LEDs, and Signal (signal state), Ready (communicable state), Choice (selection state), and Control (control state) are illustrated from the left column. In addition, black (black circle and black diamond) indicates a turn-on state, and white (white circle and white diamond) indicates a turn-off state. Here, the circular LED displays the state, and the diamond-shaped LED displays the state. In addition to this, by pressing (touching) the diamond-shaped LED, for example, it is possible to select the slave station device 102 and issue instructions such as a CSCO signal transmission instruction, a communication signal transmission instruction, and a slave station device 102 switching instruction.

For example, in the Signal column illustrating the signal state of the display panel 210 illustrated in (a) of FIG. 5, since the LED of CSCO TX is turned on, it indicates that the CSCO signal is being transmitted. Further, since the LED of CSCI RX is turned off, it indicates that the CSCI signal is not being received. Since the CSCI signal is transmitted from the slave station device 102 by the burst method, the LED of CSCI RX is instantaneously turned on only during the transmission period. Similarly, since the LEDs of Carrier TX and Carrier RX are turned on, it indicates that the communication signal is being transmitted and received.

Next, in the display panel 210 illustrated in (a) of FIG. 5, in the Ready column indicating the communicable state of the slave station device 102, since the LEDs of VSAT(1) and VSAT(2) are turned on, it can be seen that the slave station device 102(1) and the slave station device 102(2) are in a communicable state. Further, since the LEDs of VSAT(3) and VSAT(4) are turned off, it can be seen that the slave station device 102(3) and the slave station device 102(4) are not in a communicable state.

Next, in the Choice column illustrating the selected state of the display panel 210 illustrated in (a) of FIG. 5, since the diamond-shaped LED of VSAT(1) is turned on, and the LEDs of VSAT(2), VSAT(3), and VSAT(4) are turned off, it can be seen that the slave station device 102(1) is selected.

Next, in the Control column illustrating the control state of the display panel 210 illustrated in (a) of FIG. 5, the LED of CSCO TX-ON indicating the instruction to transmit the CSCO signal for the slave station device 102 to establish synchronization is turned on, it indicates that the CSCO signal is being transmitted. When the master station operator presses the LED of CSCO TX-ON, it is instructed to transmit the CSCO signal and the LED of CSCO TX-ON is turned on. Further, since the LED of Carrier TX-ON indicating the communication signal transmission instruction is turned on, it indicates that it is instructed to start transmitting the communication signal. When the master station operator presses the LED of Carrier TX-ON, it is instructed to transmit the communication signal and the LED of Carrier TX-ON is turned on. Further, since the LED of Carrier Change indicating the instruction to switch the slave station device 102 is turned off, it indicates that it is not instructed to switch the slave station device 102. When the master station operator presses the LED of Carrier Change, the operation of switching the slave station device 102 is started, the LED of Carrier Change is turned on, and the LED is turned off when the switching operation is completed.

Next, (b) of FIG. 5 will be described. (b) of FIG. 5 illustrates the state of the display panel 210 when the master station operator performs an operation of switching to the slave station device 102(2) in the state of (a) of FIG. 5 (the state in which the master station device 101 and the slave station device 102(1) are communicating with each other).

In (b) of FIG. 5, when the master station operator presses the diamond-shaped LED of VSAT(2) in the Choice column, the LED of VSAT(2) is turned on. In this state, the switching is not performed yet, and when the master station operator presses the diamond-shaped LED of Carrier Change in the Control column, the LED of Carrier Change is turned on, and it is instructed to switch from the slave station device 102(1) to the slave station device 102(2). Then, when the switching from the slave station device 102(1) to the slave station device 102(2) is completed, the LED of Carrier Change is turned off, the LED of VSAT(1) is turned off, and the LED of VSAT(2) is turned on as illustrated in (c) of FIG. 5.

As described above, the master station device 101 according to the present embodiment displays the control state such as the state of the control signal and the communication signal, the communicable state of the plurality of slave station devices 102, the selection state of the slave station device 102, and the transmission of the CSCO signal, the transmission of the communication signal, and switching of the slave station device 102 on the display panel 210. Due to this, the master station operator can easily check the state of the master station device 101 and the slave station device 102, start communication with the desired slave station device 102, and switch to another slave station device 102.

Figure 6:
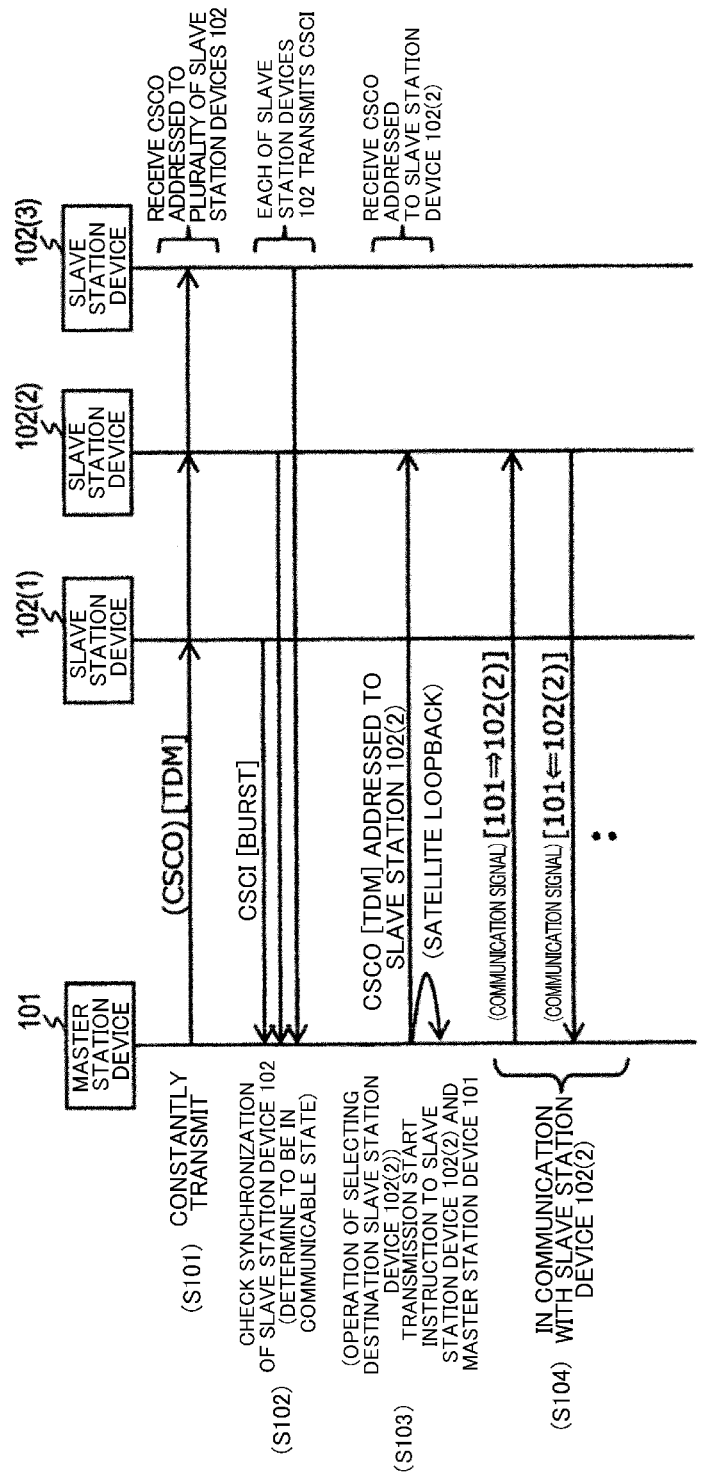
FIG. 6 is a diagram illustrating an example of a control sequence of a master station device and a plurality of slave station devices.

FIG. 6 illustrates an example of a control sequence of the master station device 101 and the plurality of slave station devices 102. Although the communication satellite 103 is omitted in FIG. 6, the communication from the master station device 101 to the slave station device 102 and the communication from the slave station device 102 to the master station device 101 are performed via the communication satellite 103. Hereinafter, the control sequence of FIG. 6 will be described in order.

In step S101, the master station device 101 constantly transmits a CSCO signal for the slave station device 102 to establish synchronization in a predetermined time slot of the TDM method. In the example of FIG. 6, the CSCO signal transmitted by the master station device 101 is received by the slave station device 102(1), the slave station device 102(2), and the slave station device 102(3), and each slave station device 102 establishes synchronization with the master station device 101.

In step S102, each slave station device 102 that has established synchronization with the master station device 101 transmits a CSCI signal indicating the establishment of synchronization to the master station device 101 in a burst method. The master station device 101 that has received the CSCI signal from the slave station device 102 determines that the slave station device 102 is in a communicable state. As described with reference to FIG. 5, the master station device 101 displays the Ready LED of the display panel 210 to notify the master station operator of the slave station device 102 in a communicable state. Here, when a plurality of slave station devices 102 transmits the CSCI signal at the same time, it is difficult for the master station device 101 to normally receive the CSCI signal. However, since the slave station devices 102 retransmit the CSCI signal at different timings, the master station device 101 can normally receive the CSCI signal.

In step S103, when the master station operator who confirmed the display panel 210 selects the slave station device 102 (for example, the slave station device 102(2)) desired to communicate with from the plurality of slave station devices 102 in a communicable state, and issues a transmission start instruction, a CSCO signal addressed to the slave station device 102(2) is transmitted. The CSCO signal instructing to start transmission is looped back by the communication satellite 103 and received by the master station device 101 itself.

In step S104, the master station device 101 that has received the CSCO signal instructing to start transmission starts transmitting the communication signal to the slave station device 102(2). Similarly, the slave station device 102(2) that has received the CSCO signal instructing to start transmission starts transmitting the communication signal to the master station device 101. Due to this, the master station device 101 and the slave station device 102(2) are in communication.

In this way, the master station device 101 according to the present embodiment can confirm the communicable slave station device 102 without the intervention of the control station device or the regulation station device, and can communicate with the slave station device 102 selected from the plurality of slave station devices 102.

Application Example

Next, as an application example of the embodiment described above, an operation when the master station device 101 switches communication from the slave station device 102 in communication to another slave station device 102 will be described.

Figure 7:
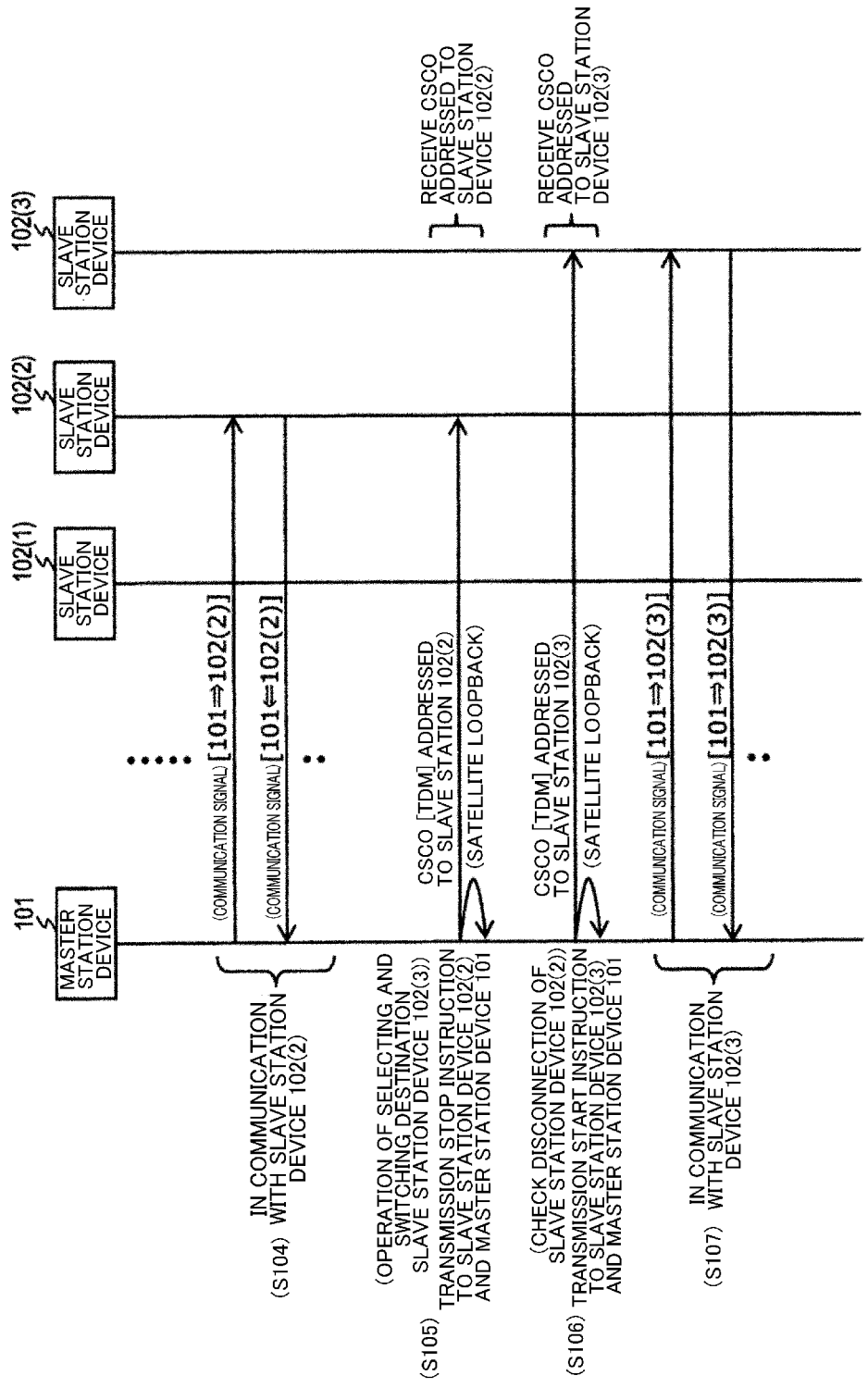
FIG. 7 is a diagram illustrating an example of a control sequence of a master station device and a plurality of slave station devices in an application example.

FIG. 7 illustrates an example of a control sequence of the master station device 101 and the plurality of slave station devices 102 in the application example. In FIG. 7, as in the control sequence described with reference to FIG. 6, the master station device 101 communicates with the slave station device 102(1), the slave station device 102(2), and the slave station device 102(3) via the communication satellite 103. Hereinafter, the control sequence of FIG. 7 will be described in order, but the processing of step S104 corresponds to the processing of step S104 having the same reference sign in the control sequence of FIG. 6, and the master station device 101 and the slave station device 102(2) are in the communication state.

Here, as described with reference to FIG. 2, a control channel for transmitting a CSCO signal from the master station device 101 to the slave station device 102, a control channel for transmitting a CSCI signal from the slave station device 102 to the master station device 101, a communication channel for transmitting a communication signal from the master station device 101 to the slave station device 102, and a communication channel for transmitting a communication signal from the slave station device 102 to the master station device 101 are frequency-division-multiplexed by the FDM method. Therefore, even when the master station device 101 and the slave station device 102 are communicating with each other, the master station device 101 can transmit the CSCO signal and receive the CSCI signal. Due to this, the master station device 101 can acquire the information on a new slave station device 102 in a communicable state during communication, display it on the display panel 210, and notify the master station operator.

In step S105, the master station operator selects a switching destination slave station device 102 (in FIG. 7, the slave station device 102(3)) from the slave station devices 102 in a communicable state on the basis of the information on the display panel 210 of the master station device 101 and then switches to the slave station device 102(3). Specifically, the master station operator presses VSAT(3) corresponding to the slave station device 102(3) from the Choice column of the display panel 210 to turn on the LED to select the slave station device 102(3). The master station operator presses the Carrier Change indicating the instruction to switch to the slave station device 102 to turn on the LED and instructs the master station device 101 to switch to the slave station device 102(3). By these operations, the master station device 101 transmits a CSCO signal instructing to stop transmitting the communication signal (transmission of fourth control signal) to the slave station device 102(2) in communication and the master station device 101. As a result, the communication signal between the master station device 101 and the slave station device 102(2) is disconnected, and the communication ends. At this point, the LEDs of Carrier TX and Carrier RX on the display panel 210 are turned off.

In step S106, the master station device 101 automatically transmits a CSCO signal instructing the slave station device 102(3) and the master station device 101 to start transmitting a communication signal following the processing of step S105 (transmission of fifth control signal). The master station device 101 receives the CSCO signal transmitted by the subject device instructing to start transmission by satellite loopback, and starts transmitting the communication signal to the slave station device 102(3). On the other hand, the slave station device 102(3) receives the CSCO signal transmitted by the master station device 101 instructing to start transmission from the communication satellite 103, and starts transmitting the communication signal to the master station device 101. Due to this, the master station device 101 and the slave station device 102(3) are in the communicating state (step S107).

In this way, the master station device 101 according to the present application example can switch the channel from the slave station device 102(2) in communication to the other slave station device 102(3) without the intervention of the control station device or the regulation station device.

As described above in the embodiments and application examples, the master station device 101 of the satellite communication system 100 can grasp whether the slave station device 102 is in a communicable state by the CSCI signal, and display the state on the display panel 210 or the like of the master station device 101 to notify the master station operator. Due to this, the master station device 101 can grasp the slave station device 102 in a communicable state and start communication even when there is no schedule management by the regulation station device or another communication means.

The master station operator selects a slave station device 102 in a communicable state on the display panel 210 or the like during the communication of the master station device 101 can performs an operation of switching to the slave station device 102 whereby the master station device 101 can switch the communication from the slave station device 102 in communication to another slave station device 102. Due to this, even if there is no schedule management by the regulation station device or another communication means, it is possible to switch the connection destination slave station device 102 only by the operation of the master station device 101.

As described above, the satellite communication system, the master station device, and the channel connection method according to the present invention can connect and switch the channel between the portable station devices without the intervention of the control station device or the regulation station device.

REFERENCE SIGNS LIST

100 Satellite communication system
101 Master station device (portable station device)
102 Slave station device (portable station device)
103 Communication satellite
110 Router
111 VoIP unit
112 Telephone
113 PC
201 Modulation/demodulation unit
202 Frequency conversion unit
203 High-power amplification unit
204 Antenna
205 Low-noise amplification unit
206 Control unit
207 Display/operation unit
210 Display panel
900 Satellite communication system
901 Portable station device
902 Communication satellite
903 Base station device
904 Control station device
905 Network
906 Regulation station device
907 HMI

The invention claimed is:

1. A satellite communication system that communicates via a communication satellite using one of a plurality of portable station devices as a master station device and another portable station device as a slave station device, the master station device is configured to:
transmit a first control signal for the slave station device to establish synchronization;
determine that the slave station device is in a communicable state by a second control signal received from the slave station device that has received the first control signal and established synchronization; and
select one of at least one slave station devices in a communicable state and transmit a third control signal for instructing start of transmission of a communication signal to the selected slave station device and the subject device,
wherein when the master station device communicates with another slave station device different from the slave station device in communication and has received an instruction to switch to a destination slave station device selected from the slave station devices determined to be in a communicable state by the second control signal,
the master station device transmits a fourth control signal instructing to stop transmission of the communication signal to the slave station device in communication and the subject device, and the master station device transmits a fifth control signal instructing to start transmission of a communication signal to the switching destination slave station device and the subject device.

2. The satellite communication system according to claim 1, wherein the first control signal, the third control signal, the fourth control signal, and the fifth control signal are CSCO signals, and the second control signal is a CSCI signal.

3. A master station device that is one of a plurality of portable station devices and communicates via a communication satellite using another portable station device as a slave station device, comprising:
a control unit configured to:
transmit a first control signal for the slave station device to establish synchronization;
determine that the slave station device is in a communicable state by a second control signal received from the slave station device that has received the first control signal and established synchronization; and
select one of at least one slave station devices in a communicable state and transmit a third control signal for instructing start of transmission of a communication signal to the selected slave station device and the subject device,
when the control unit communicates with another slave station device different from the slave station device in communication and has received an instruction to switch to a destination slave station device selected from the slave station devices determined to be in a communicable state by the second control signal,
the control unit transmits a fourth control signal instructing to stop transmission of the communication signal to the slave station device in communication and the subject device, and
the control unit transmits a fifth control signal instructing to start transmission of a communication signal to the switching destination slave station device and the subject device.

4. A channel connection method for a master station device and a slave station device to perform communication in a satellite communication system that communicates via a communication satellite using one of a plurality of portable station devices as the master station device and another portable station device as the slave station device, wherein the master station device executes the processes of:
transmitting a first control signal for the slave station device to establish synchronization;
determining that the slave station device is in a communicable state by a second control signal received from the slave station device that has received the first control signal and established synchronization; and
selecting one of at least one slave station devices in a communicable state and transmitting a third control signal for instructing start of transmission of a communication signal to the selected slave station device and the subject device,
wherein when the master station device communicates with another slave station device different from the slave station device in communication and has received an instruction to switch to a destination slave station device selected from the slave station devices determined to be in a communicable state by the second control signal, the master station device executes the processes of:

transmitting a fourth control signal instructing to stop transmission of the communication signal to the slave station device in communication and the subject device, and transmitting a fifth control signal instructing to start transmission of a communication signal to the switching destination slave station device and the subject device.

5. The channel connection method according to claim 4, wherein the first control signal, the third control signal, the fourth control signal, and the fifth control signal are CSCO signals, and the second control signal is a CSCI signal.

\* \* \* \* \*